Patented Aug. 26, 1952

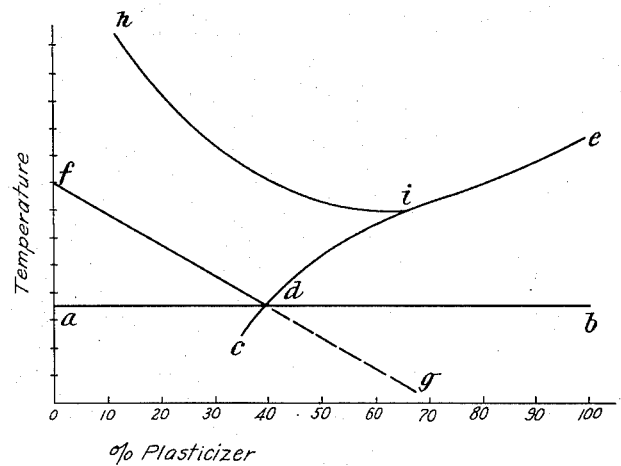

2,608,542

UNITED STATES PATENT OFFICE 2,608,542

HEAT-ENERGIZABLE ADHESIVES AND COATED PRODUCTS AND PROCESS OF MAKING SAME

Robert L. Smith, Gorham, and Charles M. Wiswell, Westbrook, Maine, assignors to S. D. Warren Company, Boston, Mass., a corporation of Massachusetts Application September 26, 1950, Serial No. 186,818

24 Claims. (Cl. 260—27)

This invention relates to heat-energizable or heat-activatable adhesive compositions, i. e. materials which become adhesive only after heating, to sheet or other material coated therewith, and to processes for producing such adhesive compositions.

Broadly speaking, heat-activatable adhesive compositions are old, such compositions having been used to stick together two substances, e. g. two sheets of paper, under the combined action of heat and pressure. Such materials are commonly referred to as being "heat-sealing." In many cases, e. g., in applying a label to a glass container, it is inexpedient to apply heat while the two surfaces are in contact. Accordingly, simple heat-sealing compositions are not satisfactory for use in such cases. More recently, however, heat-activatable adhesive compositions have been developed which, when once activated or fused by heat and allowed to cool, remain adhesive thereafter for a period of greater or less extent. Sheet material, e. g., a paper label, coated with such a heat-activatable adhesive composition will possess, after the said composition has been heat-activated and for as long as adhesiveness persists, all the advantages of an ordinary pressure-sensitive coated sheet but at the same time avoids the expense and inconvenience attendant upon the use of a protective or carrier sheet to prevent the adhesive sheets sticking to other objects or to each other before they are used.

It is also possible to make adhesive substances which, when once heat-activated, thereafter for a period remain tacky or pressure-sensitive and later become hard and non-tacky. This is accomplished by fusing together in proper proportion resin and solid plasticizer therefor, cooling the fusion until it solidifies, and grinding the solidified conglomerate to powder. In such a powder all of the individual particles of the adhesive material are identical in composition. This composition is not part of the present invention and therefore is not claimed herein.

The present invention makes use of a powdered fusion product similar to that just described in admixture with other substances in particle form to produce adhesive products which after heat-activation may have far longer periods of extended tack, as well as other desirable properties. It is found, for instance, that an improved adhesive composition with a softening point reducible by heat-activation may be made from a mixture of finely divided particles of two separate and different resinous adhesive compositions each of which by itself can function as a simple heat-sealing composition, each particle of at least one of the compositions comprising a conglomerate formed by fusing together resin and a quantity of solid plasticizer therefor in excess of the amount permanently compatible with the resin at room temperature.

The behavior of the heat-activatable adhesive products made by fusing together resin and solid crystalline plasticizer can be described in connection with the accompanying drawing in which the single figure is a diagram of solubility, brittle line, and fluidity line curves.

In the figure the ordinates represent temperature and the abscissas represent percentage composition by weight, ranging from zero percent plasticizer at the left of the diagram to 100 percent plasticizer at the right. The curves are drawn for mixtures of a particular resin and a particular plasticizer, namely, polystyrene having a molecular weight of about 9000 and tri (para- tert.-butyl phenyl) phosphate. Similar curves can be drawn for any other combination of resin and plasticizer. Naturally curves for other combinations will not coincide exactly with the curves shown, but the same general pattern will be observed in all cases. Hence the diagram may be considered typical for any fusion combination of the invention.

When a resin and a solid plasticizer therefor are melted together in any proportion the result is a transparent melt having every appearance of a true solution, i. e., a molecular dispersion of solute in solvent. It appears that in this system the resin may be considered to be the solvent, and the plasticizer to be the solute. In the drawing the line *cde* may be considered the line of solubility, saturation, or permanent compatibility. At any temperature and composition above and to the left of line *cde* the plasticizer and resin are compatible, whereas below line *cde* there is present a greater quantity of plasticizer than is permanently completely compatible with the resin, which sooner or later causes loss of transparency and development of cloudiness in the mixture. Given sufficient time any melt cooled to the line *cde* will become hard and brittle. Proper manipulation may bring about hardening in a short time—almost instantly. Normally, however, molten mixtures of the resin and plasticizer may be cooled considerably below line *cde* and may be kept there in a fluid or semi-fluid condition for a considerable time before solidification occurs. While this supercooled condition exists the plasticizer and resin remain in a state of transient or metastable compatibility; upon aging for a greater or less period, however, a degree of incompatibility will develop resulting in solidification and loss of transparency. The controlled use of this metastable compatibility is a characteristic of the process of the invention. Thus in general any mixture falling to the right of point $d$ may by proper treatment be obtained in solid form at room temperature but when again reactivated by heat it may remain in tacky, adhesive condition for some time before again becoming solid. When the placticizer content is high, i. e., for mixtures approaching point $b$ on the room temperature line $ab$ the period of adhesiveness may be relatively short, say, a few minutes or hours; for mixtures slightly to the right of $d$ the period of adhesiveness may last for months.

Mixtures falling to the left of point $d$ in general do not exhibit the property of extended adhesiveness or delayed setting. Such mixtures, however, may be very useful according to the invention when they are used in conjunction with a mixture lying considerably to the right of point $d$; in that case the combination of the two mixtures may yield after activation a useful blend which still lies somewhat to the right of point $d$.

The line $fd$ is the "brittle line" given by solutions of plasticizer in resin. It may be considered to represent the line at which the resinous mass ceases to be easily friable and has softened sufficiently to be somewhat flexible. The extension of line $fd$ to $g$ is a line to which molten solutions of resin and plasticizer may be cooled while in the metastable state before becoming brittle. The area above $dg$ and below $die$, however, as explained above, is one of metastable equilibrium, because eventually, given sufficient time, the melt will solidify along line $die$. Line $dg$ may therefore be considered a temporary line of brittleness, and line $die$ the eventual or permanent line of brittleness.

Since a resin does not possess a sharp melting point there is a wide temperature difference between the point at which a resin ceases to be brittle and the point at which it is freely fluid. One way to obtain an arbitrary "fluidity temperature" of a resin is to sprinkle powdered resin along a heated bar having a known temperature gradient and then to observe the point on the bar at which the powdered resin becomes instantly transparent. The line $hie$ represents fluidity temperatures obtained in the manner described. From $i$ to $e$ the fluidity line is substantially identical with the compatibility line, since the solid fusion product will not melt until a temperature is reached at which the components are completely compatible.

From the foregoing description it is apparent that each particle obtained by powdering any solidified fusion product falling below line $fd$ will consist wholly of a solid solution of plasticizer in resin, and on melting will not exhibit the phenomenon of supercooling since it does not contain sufficient plasticizer to cause incompatibility at the temperature in question. On the other hand, every individual particle obtained by finest mechanical disintegration of a solidified fusion product falling below line $die$ will, on remelting, exhibit the phenomenon of supercooling, i. e., will become tacky on heating and retain the tackiness for some time after cooling to room temperature, since it contains plasticizer in excess of the amount which will be permanently compatible with the resin at the temperature in question.

Reference to the drawing indicates that any composition falling to the right of point $d$ on line $ab$ will have a period of extended adhesiveness at room temperature for as long as the state of metastable equilibrium can exist before incompatibility of excess plasticizer with the resin is effective to cause solidification of the mixture. All high-plasticizer compositions useful under the invention are characterized by possessing a greater proportion of plasticizer than is permanently compatible with the resin. In case of the polystyrene resin and tri (para tert.-butyl phenyl) phosphate plasticizer represented by the curves of the diagram, the point $d$, to the right of which only metastable compatibility can exist, is approximately at 40 percent plasticizer content.

The minimum plasticizer content which will yield the deisred extended period of adhesiveness or delay in setting, or produce metastable compatibility in the mixture, will vary depending both on the particular plasticizers and the particular resins used. The following Table I shows typical plasticizer and resin combinations which possess complete compatibility at low plasticizer content and metastable compatibility at higher plasticizer content; the approximate plasticizer level at which incompatibility may begin is also shown in the table. In the table the figures are the percentages of the plasticizer in the compositions by weight, and these figures correspond to point $d$ on the diagram of the figure.

TABLE 1

| Resin | Plast. 1 | Plast. 2 | Plast. 3 | Plast. 4 | Plast. 5 | Plast. 6 | Plast. 7 | Plast. 8 |
|---|---|---|---|---|---|---|---|---|
| Staybelite | 10 | 22 | 24 | 25 | 25 | 27 | 27 | 35 |
| Polypale resin | | 32 | 35 | 36 | 36 | 40 | 40 | 45 |
| Wood rosin AB | | 30 | 33 | 34 | 34 | 38 | 37 | 42 |
| Synthetics A-56 | | 34 | 37 | 41 | 41 | 42 | 43 | 47 |
| Polypale Ester 10 | | 39 | 43 | 35 | 35 | 46 | 45 | 55 |
| Dow PS2 | | 40 | 40 | 40 | 40 | 40 | 40 | 40 |
| Nevindene R-3 | | 41 | 45 | 47 | 47 | 52 | 51 | 58 |
| Pentalyn G | | 41 | 45 | 50 | 46 | 52 | 51 | 57 |
| Synthetics A-52 | | 45 | 49 | 51 | 51 | 56 | 55 | 63 |
| AYAC | | | | 40 | | | 40 | |

In the preceding table the matrials mentioned may be identified as follows:

Plasticizer 1 is acetanilid.

Plasticizer 2 is a meta-terphenyl sold as "Santowax M" by Monsanto Chemical Company.

Plasticizer 3 is ortho-terpenyl sold as "Santowax O" by Monsanto Chemical Company.

Plasticizer 4 is diphenyl phthalate.

Plasticizer 5 is dicyclohexyl phthalate sold as "KP 201" plasticizer by Ohio Apex, Inc.

Plasticizer 6 is N-ethyl paratoluene sulfonamide sold as "Santicizer 3" by Monsanto Chemical Company.

Plasticizer 7 is N-cyclohexyl paratoluene sulfonamide sold as "Santicizer IH" by Monsanto Chemical Company.

Plasticizer 8 is tri (para tert.-butyl phenyl) phosphate sold as "Plasticizer 77" by Dow Chemical Company.

"Staybelite" is hydrogenated rosin sold by Hercules Powder Company.

"Polypale" resin is polymerized rosin sold by Hercules Powder Company.

"Wood rosin AB" is a grade of wood rosin sold by Hercules Powder Company.

"Synthetics A-56" is an adduct of maleic anhydride and pentaerythritol ester of rosin sold by Hercules Powder Company.

"Polypale Ester 10" is a glyceryl ester of polymerized rosin sold by Hercules Powder Company.

"Dow PS2" is a polystyrene of low (about 9000) molecular weight sold by Dow Chemical Company.

"Nevindene R3" is a grade of indene resin of M. P. 150° C. sold by Neville Company.

"Pentalyn G" is a modified pentaerythritol ester of rosin sold by Hercules Powder Company.

"Synthetics A-52" is a pentaerythritol ester of polymerized rosin acids sold by Hercules Powder Company.

"AYAC" is a low molecular weight polyvinyl acetate having a softening point of 45–60° C., sold by Carbide and Carbon Chemicals Corporation.

It is apparent from the foregoing Table 1 that in all except the case of "Plasticizer 77" metastable compatibility exists when the plasticizer content is at least 60 percent, and in all cases when the plasticizer content is 65 percent.

Important steps in preparing the high-plasticizer blend used as one component of the product of the invention are (1) to fuse together to a clear homogeneous fluid melt, readily fusible resin and a quantity of solid crystalline plasticizer known to be greater than that permanently compatible with said resin at room temperature, (2) to harden the melt until it is solid at room temperature, i. e., until incompatibility has developed, and (3) to powder the solid fusion product. To harden the melt rapidly the molten mass may be stirred at a temperature slightly below the lowest temperature at which complete permanent compatibility can exist, which is always somewhat below the melting point of the plasticizer and is represented by the line *die* of the diagram. For convenience of reference this lowest temperature at which complete permanent compatibility can exist will be referred to hereinafter as the "equilibrium compatibility temperature." Treatment under the conditions indicated ordinarily results in solidification within a reasonable time, whereupon the solid material can readily be powdered.

When the solidified mass described is crushed or even ground to the finest particles distinguishable under a high-powered microscope, all particles appear identical.

The crushed or powdered high-plasticizer blend, i. e., the composite solid fusion product containing more plasticizer than is permanently compatible with the resin therein, may be mixed with a powdered resin, or with a powdered solid solution of a plasticizer in a resin such as is represented by any composition on the line *ad* of the diagram. An important use for such mixtures of powdered materials is to form the potential adhesive in an aqueous coating composition applied to the surface of sheet material, such as paper for example, as will subsequently be explained in greater detail.

From the preceding discussion in relation to the diagram it is apparent that when a high plasticizer blend, say 80 plasticizer to 20 resin, is mixed with another composition of lower plasticizer content and the mixture is heat-activated, the resultant adhesive may subsequently possess a lower softening point than that of the original mixture before activation. Besides a lower softening point, the said resultant adhesive composition may, and usually does, possess other improved qualities in use, such as increased bonding strength and improved permanence of bond.

A solid plasticizer to be suitable for use in preparing such a high-plasticizer blend as has been described must be characterized by some degree of supercooling after having been melted, and moreover it must be completely compatible with the resin in question at temperatures above its own melting point but must be incompletely compatible therewith at room temperature in mixtures in which it amounts to from 80 to 95 percent of the total weight. Typical solid plasticizers useful in preparing the compositions of the invention are listed below in Table 2.

TABLE 2

Acetanilide
Dicyclohexyl phthalate
N-cyclohexyl paratoluene sulfonamide
N-ethyl paratoluene sulfonamide
Tri (para tert.-butyl phenyl) phosphate The very many resins suitable for use include both synthetic resins that become readily fluid when fused as well as resins of vegetable origin both in their natural state or in modified condition. A few of the many suitable resins are listed in Table 3.

TABLE 3

Indene resin of M. P. 150° C.
Polyvinyl acetate having a softening point between 40 and 60° C.
Polystyrene of molecular weight about 9000
"Pentalyn G"
"Polypale Ester 10"
"Staybelite"
"Synthetics A-56"
Kauri copal
Mastic resin
Sandarac resin
Rosin
Ester gums, or glyceryl esters of natural resins such as rosin or copal.

It is of course possible to make a single fusion of plasticizer and resin which will fall at any desired point between *d* and *b* of the line *db* in the diagram of the figure. We have found, however, that some advantages result from using a powdered high-plasticizer blend which falls on the line *db* at a point nearer to *b* than to *d*, and to mix therewith a powdered resinous material containing much less or no plasticizer. Compositions falling near the point *b* exhibit relatively short periods of adhesiveness or tack following heat-activation, say in the order of a few hours or days; whereas compositions falling near the point *d* on line *db* exhibit much longer periods of adhesiveness, say in the order of months or possibly years. It is found, generally speaking, that it is frequently very difficult to cause solidification of the composition having long periods of adhesiveness subsequent to activation, that is, compositions lying near $d$ on line $db$; such compositions can be made to solidify, but the time and effort required to accomplish the desired result may make the products uneconomical to use.

Moreover, the nearer the composition of the high-plasticizer blend approaches $d$ along $db$, the nearer the temperature above which the composition remains permanently tacky approaches room temperature. This may be noted by observing the slope of line $die$ in the diagram of the figure. Hence, although it is possible, with difficulty, to solidify and grind such a composition lying near point $d$ on line $db$ and so produce a powder useful for many purposes, nevertheless such a composition may have a tendency to "block," i. e. for sheets to stick together when piled one upon another, at a temperature so low that its use is not feasible for many other purposes. For example, in some cases it might not be feasible to use such a composition as adhesive on the reverse side of a label paper which is intended to be printed thereafter.

The present invention makes possible the production of adhesive products which after heat-activation may have any desired period of prolonged tackiness, yet which before activation are free from liability towards blocking. As has been pointed out, this desirable end is accomplished by mixing together in a single coating composition (1) powdered high-plasticizer fusion products and (2) powdered preponderently resinous material which may be a low-plasticizer fusion product or simply powdered resin.

It is preferred to make our high-plasticizer fusion products contain at least 70 percent of plasticizer, with 75 or 80 percent of plasticizer being even more desirable. On the other hand, the upper plasticizer limit desirable is about 95 percent. Compositions containing over 95 percent of plasticizer are in general so lacking in viscosity in the molten state that they fail to develop appreciable advantage over simple molten plasticizer alone, for example in respect to undesirable penetration of the low-viscosity molten material into base material coated therewith.

In most cases the second or preponderently resinous powdered component will contain from zero to 30 percent of crystalline plasticizer. The preferred range for the composition of the preponderently resinous component, judging from the majority of the many trials so far made, is from about 5 percent of crystalline plasticizer and 95 percent of resin to about 25 percent of crystalline plasticizer and 75 percent of resin.

Roughly it can be expected that most useful mixtures of the invention will fall within the limits of 55 to 99 percent of high-plasticizer fusion component and 45 to 1 percent of preponderently resinous component. The preferred range is from about 60 to 95 percent of high-plasticizer fusion product and from about 40 to 5 percent of low-plasticizer fusion product. Examples 1 and 2 hereinafter are typical instances where the high-plasticizer component falls near the upper of the above-mentioned limits therefor; while Example 25 of Table 6, shown later herein, is a good and useful mixture in which the high-plasticizer component is near the previously mentioned lower limit therefor.

Broadly speaking, the composition of the invention, comprising powdered fusions of resin and crystalline plasticizer, offer several advantages over prior compositions in which resin and crystalline plasticizer are kept individually separate up to the time of heat-activation. In the first place, the compositions of the invention can in general be activated at a somewhat lower temperature than those of the prior art in which the plasticizer and resin are maintained separate. Moreover, for complete activation, the compositions of the invention in general need be held at fusion temperature for a shorter time than do comparable prior art compositions. Furthermore, in the case of paper coated with compositions of the invention less adhesive material is lost by absorption into the paper than is lost in general from comparable prior art compositions. It appears that when two powdered resin-plasticizer fusion products—one high in plasticizer and the other low in plasticizer—are used as described, the resulting adhesive composition may be even more quickly activated by heat than if one of the powders consists of resin alone.

It is likewise found that compositions of the invention have valuable properties for use in cases where simple heat-sealing techniques are followed. Here again a lower temperature for a shorter period is effective in activating compositions of the invention in comparison with customary heat-sealing adhesives. Moreover, the lower softening temperature of the compositions subsequent to initial heat-activation is advantageous in promoting greater flexibility of adhesive made from compositions of the invention. It may be added that when said simple heat-sealing techniques can be followed the ratio of high-plasticizer fusion and low-plasticizer fusion (or resin alone) used in the coating composition can be varied at will so that the resulting melted adhesive finally formed when the coating is activated by heat may lie either to the right or to the left of point $d$ on the diagram of the figure. This is because in such a case delay in setting is ordinarily of no importance.

As has been previously mentioned, a very important use for the powdered fusion products of high solid plasticizer content as hereinbefore described is in aqueous coating compositions to be applied to paper or other sheet material to form a heat-activatable adhesive coating thereon whereby said paper or other sheet material may readily be attached to another surface as desired. The problems involved in preparing and applying such a coating to sheet material are in general similar to those known in the art of applying aqueous coating compositions. When the powdered resinous fusion composition has once been wet with aqueous fluid it is surprising how greatly coating compositions made therewith resemble ordinary clay coating compositions. As binders to bind the powder to the surface coated therewith there may be used the identical binders commonly used in making clay coated papers, and in approximately the same amounts. The aqueous compositions so made may have approximately the same percentage of solids content as usual clay coating compositions, and they may be applied to paper by the same coating methods and in substantially the same amounts as is customary with such clay coating compositions.

Ordinarily the powdered adhesive material deposited on a sheet from a water dispersion thereof will not adhere firmly to the sheet, but may fall off during handling. Accordingly it is desirable to add a binder to the coating compositions as is done with clay coatings and the like, but the quantity of binder used is not particularly critical. It is in general found sufficient to bind 100 parts of powdered resinous matter if there is used from 4 to 10 parts of polyvinyl alcohol, dextrin, modified starch, solubilized casein, solubilized soy protein, or animal glue, but it is preferred to use binders that are themselves resinous in nature, and which may even blend with or at least be acted on by the molten plasticized resinous material, since such binders interfere less with the heat-activation of the coating.

Some binders of a resinous nature which are sometimes used in clay coatings and which have been found suitable for use to bind the heat-activated resinous powder are various primary emulsions of emulsion polymerized styrene-butadiene copolymer, styrene-isoprene copolymers, butadiene-acrylonitrile copolymers, copolymerized acrylonitrile and methyl acrylate, and the like, as well as natural rubber latex which in general is not a satisfactory adhesive for ordinary clay coated printing paper. Of these, consideration of costs indicate the use of styrene-butadiene copolymers; a very satisfactory grade of the latter is the commercial product sold by the Dow Chemical Company as "No. 512K latex." Since a film of the styrene-butadiene copolymer may itself be rather soft and inclined to a tendency to "block" it is advantageous to harden the binder somewhat by combining a harder polymer with the styrene-butadiene copolymer. Excellent results have been obtained by using equal parts by weight of styrene-butadiene copolymer and emulsion polymerized polystyrene of high (about 80,000) molecular weight. Such an elastomeric latex composition may be referred to as an aqueous dispersion of a rubbery emulsion polymer of a composition containing an ethylenically unsaturated monomer.

The emulsion polymerized elastomers mentioned above as desirable binding agents are sometimes called "primary emulsions," indicating that the dispersion has been formed by polymerization in situ, in contra-distinction to "secondary dispersions" formed by redispersion of agglomerated matter in an aqueous medium. Obviously dispersions of the powdered resinous fusion products of the invention are secondary dispersions. The preferred coating compositions of the invention, therefore, comprise in an aqueous medium a secondary dispersion of a high-plasticizer resinous fusion product each particle of which contains solid plasticizer in excess of that compatible with the resin, a secondary dispersion of a low-plasticizer resinous fusion product or/and resin, a dispersing agent, and a primary emulsion of a rubbery polymer of a composition containing an ethylenically unsaturated monomer, the latter constituent in general not exceeding 25 percent by weight of the total solids present in the coating composition.

The resins and the resin-plasticizer fusion products used according to the invention are ordinarily not wettable by water. Consequently some dispersing agent must be used to disperse the powdered resinous masses in an aqueous medium. If a powder is used which possesses a relatively high acid number, such as the "Synthetics A-56" resin of Table 1, a little ammonia or other alkali dissolved in the water will bring about satisfactory dispersion of the resin therein; apparently a certain amount of ammonium resinate or other soluble resinate is formed thereby which acts as a dispersing agent for the rest of the powder. In cases where the resin used is not one which is readily dispersed by use of alkali, various soaps may be used as dispersing agents, especially soaps of ammonia, morpholine, ethanolamine or other amines.

The particular type of dispersing agent used is not too important. The anionic dispersing agents like those just mentioned are very satisfactory; on the other hand, cationic agents, such as lauryl pyridinium chloride, also give good results; and non-ionic dispersing agents may also be used, such as various aryl alkyl polyether alcohols, e. g., an isooctyl phenyl ether of polyethylene glycol.

In practice it is found advantageous to use as dispersing agent the product formed by treating with ammonia, or other alkali such as caustic soda, a resin of high acid number such as the "Synthetics A-56" before mentioned. In such a case the resin serves a double purpose; it helps disperse the powdered resinous matter and when the coating is heated it also blends with the rest of the melt. Either of two procedures may be followed: the "Synthetics A-56" resin or equivalent may be included in the fusion along with another resin and plasticizer and the powder prepared therefrom may be treated with alkali, or an aqueous solution of the product made by treating "Synthetics A-56" resin with alkali may be used to wet a powdered resinous composition. In most cases it is advantageous to combine both uses of "Synthetics A-56" as dispersant in preparing a single coating composition; for example, some "Synthetics A-56" resin may be included in the fusion and the powdered product resulting therefrom may also be wet with an aqueous ammoniacal solution of "Synthetics A-56" resin. In place of the "Synthetics A-56" mentioned, there may be used with somewhat similar results either plain rosin or other derivatives of rosin which are compatible with the other ingredients of the molten mixture and which have acid numbers sufficiently high to enable said rosin composition to be soluble in aqueous alkali. It is found that when such rosin or rosin derivative is used as the resin or as a portion of the resin in a high-plasticizer fusion, then the resulting powdered solidified fusion product may readily be dispersed in water by use of ammonia or other alkali alone; whereas in the case of a powdered low-plasticizer fusion product containing the same rosin or rosin derivative it is preferable to use additional dispersing agent with the ammonia or other alkali, e. g. dissolved ammonium or sodium resinate.

In cases where adhesive coatings are prepared from powdered resin-plasticizer fusions containing rosin or rosin derivatives of the nature previously described it is rather surprisingly found that the blocking temperature of the coating is considerably higher when the powder is dispersed by means of a fixed alkali than when it is dispersed by ammonia or by dispersing agents other than fixed alkali. Suitable fixed alkalis include lithium, sodium and potassium hydroxides, and sodium and potassium carbonates. Moreover, the blocking temperature of the coating is higher when the rosin or rosin derivative is actually included in the fusion product and subsequently treated with fixed alkali than when the rosin or rosin derivative is merely added separately to the aqueous system either in powdered form to be subsequently acted on by fixed alkali or already combined with fixed alkali.

An embodiment of the invention is shown in the following example.

Example 1

A high-plasticizer fusion was made by fusing together the substances shown in Example 8 of the following Table 4.

The temperature of the mix was raised to somewhat over 300° F. to ensure complete fusion and blending. The molten mass was then cooled rather rapidly to about 165° F., and was then allowed to cool slowly thereafter while it was kept constantly stirred. At somewhat above 140° F. stirring was terminated and the still liquid mass was poured upon a cold metal slab, where it quickly became solid. The solidified fusion product was then ground to a powder in a hammer-mill, and enough of the powder was weighed out to amount to 95 parts by weight in a coating composition.

Another, or low-plasticizer, fusion was made according to the formula of Example 16 of the following Table 5, the temperature being raised to somewhat over 300° F. to ensure complete fusion and blending. The melt was then poured on a cold metal slab, where it quickly became solid. The solidified fusion product was then ground to a fine powder in a hammer-mill, and enough of this powder was weighed out to amount to 5 parts by weight in a coating composition.

A mixture was made of 3.6 parts by weight of water, 0.3 part by weight of caustic soda, and 1.2 parts by weight of the "Synthetics A-56" of Table 3. This mixture formed a clear solution; its function was to act as a wetting or dispersing agent to help disperse the powdered resinous material in aqueous medium. This solution was then added to a mixture of 95 parts by weight of water to which were added in succession 0.25 part of caustic soda, and 20 parts by weight of a 45 percent solids emulsion of an emulsion polymerized of 60:40 styrene butadiene copolymer, followed by 22 parts by weight of a 40 percent solids emulsion of emulsion polymerized polystyrene of high molecular weight. To this aqueous mixture, while it was being well agitated, was then added the 95 parts by weight and 5 parts by weight of the respective powdered fusion products mentioned above. The whole charge was put into a ball-mill and ground for several hours, the grinding action serving completely to disperse the resinous powder in the aqueous medium as well as to decrease somewhat further the size of the particles of the resinous fusion products.

When the aqueous mixture was withdrawn from the ball-mill it was then applied by means of a conventional air-knife coating machine to the uncoated side of a commercial grade of clay-coated label paper. The dry weight of coating applied amounted to about four pounds per thousand square feet of surface coated. The paper so coated was dried at a temperature below 125° F. to avoid activation of the coating. The finished product was readily activatable by heat, and when so activated remained in adhesive or pressure-sensitive condition for several days. The activated adhesive paper was applied successfully by hand to various surfaces including glass, metal and regenerated cellulose sheet. The paper product also performed satisfactorily in a commercial labeling machine of the type where heat-activation was performed at one station and pressure application was made at a subsequent station. The adhesive coated paper when wound into a roll was found not to "block" or stick together until the temperature of 140° F. was reached, which temperature was therefore considered to be the blocking-temperature of the product.

*Example 2*

Another embodiment of the invention was made like that of Example 1 except that ammonia was used therein in place of caustic soda; that is, 1.2 parts by weight of strong ammonia water was used to dissolve the 1.2 parts by weight of "Synthetics A-56" used as dispersing agent, and 1 part by weight of strong ammonia water was added to the coating composition itself instead of the 0.25 part of caustic soda used in Example 1. All other procedure followed was exactly as described in Example 1. The coated paper product resulting appeared identical with that of Example 1 except for the fact that its blocking-temperature was about 10° F. lower than that of the product of Example 1. The product of Example 2 was perfectly satisfactory for many purposes; but for use under conditions where blocking must be guarded against, the product of Example 1, made by use of fixed alkali, is superior to the product of Example 2.

Products comparable to those of Examples 1 and 2 can be made by use of other dispersing agents of any of the types thereof previously mentioned and also by use of primary emulsions of elastic adhesive other than those used in Examples 1 and 2. Moreover, various other high-plasticizer fusions and low-plasticizer fusions or resins can be used according to the invention with good results.

A few of many high-plasticizer resinous compositions suitable for use according to the invention are listed in following Table 4, in which all parts are by weight.

TABLE 4

*Example 3*

85 parts N-ethyl paratoluene sulfonamide
10 parts indene resin of 150° C. M. P.
5 parts "Synthetics A-56"

*Example 4*

85 parts tri (para tert.-butyl phenyl) phosphate
10 parts "Pentalyn G"
5 parts "Synthetics A-56"

*Example 5*

85 parts N-cyclohexyl paratoluene sulfonamide
10 parts "Polypale Ester 10"
5 parts "Synthetics A-56"

*Example 6*

85 parts N-cyclohexyl paratoluene sulfonamide
10 parts "Pentalyn G"
5 parts "Synthetics A-56"

*Example 7*

85 parts N-cyclohexyl paratoluene sulfonamide
10 parts indene resin of 150° C. M. P.
5 parts "Synthetics A-56"

*Example 8*

80 parts diphenyl phthalate
5 parts indene resin of M. P. 150° C.
9 parts "Pentalyn G"
6 parts "Synthetics A-56"

*Example 9*

80 parts diphenyl phthalate
10 parts polystyrene of mol. wt. about 9000
10 parts "Synthetics A-56"

*Example 10*

80 parts N-cyclohexyl paratoluene sulfonamide
15 parts "Polypale Ester 10"
5 parts "Synthetics A-56"

Example 11

80 parts tri (para tert.-butyl phenyl) phosphate
15 parts "Pentalyn G"
5 parts "Synthetics A-56"

Example 12

80 parts dicyclohexyl phthalate
10 parts "Polypale Ester 10"
10 parts polystyrene of mol. wt. about 9000

Example 13

85 N-cyclohexyl paratoluene-sulfonamide
15 polyvinyl acetate of softening point 50° C.

Among many preponderantly resinous substances or low-plasticizer blends which may be used according to the invention are included the resins previously listed in Table 3 and the high-resin fusion products shown in following Table 5.

TABLE 5

Example 14

94 "Pentalyn G"
6 "Synthetics A-56"

Example 15

70 indene resin of M. P. 150° C.
30 acetanilide

Example 16

79 indene resin of M. P. 150° C.
6 "Synthetics A-56"
15 diphenyl phthalate

Example 17

40 "Polypale Ester 10"
20 "Pentalyn G"
40 tri (para tert.-butyl phenyl) phosphate

Example 18

45 indene resin of M. P. 150° C.
45 "Synthetics A-56"
10 diphenyl phthalate (In the foregoing examples the parts are by weight.)

It is apparent that even in the case of any one specific powdered high-plasticizer fusion product, a very great number of useful combinations are obtainable by mixture (1) with similar powdered high-plasticizer fusion products which contain different resin or/and different plasticizer, (2) with powdered high-resin, low-plasticizer fusion products, or (3) with powdered resin. By simultaneous variation of the powdered high-plasticizer fusion product used an almost infinite number of useful combinations can be obtained.

A few examples given in following Table 6 show how a very great variation in period of delay or extended tackiness can readily be obtained. The preceding examples showing mixtures of powdered high-plasticizer and high-resin fusion products have been ones which yield compositions exhibiting prolonged tackiness subsequent to heat-activation. The following example, Example 26, shows a combination of high-plasticizer fusion and high-resin fusion which after heat-activation does not exhibit prolonged tackiness or delay in setting, but which is usable by ordinary heat-sealing techniques, i. e., by application of heat while the adhesive coated product is in contact with the surface to which it is to adhere.

Example 26

2 parts by weight of the powdered fusion product of Example 8 and 3 parts by weight of the powdered fusion product of Example 16 were made into a coating composition by the same procedure used in preceding Example 2. The coating composition was applied to paper and dried. The resulting paper was satisfactorily sealed to glass and to various other surfaces by application of heat to the non-adhesive side of the paper while the adhesive-coated side thereof was in contact with the surface to which it was intended to adhere.

It is apparent that the various compositions or coatings described can be applied to other sheet or web material as well as to paper, for example to cloth, leather, flexible films, fiberboard and the like.

We claim:

1. Sheet material having on one side a heat-activatable adhesive coating which comprises a substantially uniform mixture of finely divided, individually distinct, particles of two different solid heat-activatable adhesive substances, each individual particle of one of said adhesive substances comprising a homogeneous fusion of a resinous material with a greater quantity of a solid plasticizer and each particle of the second of said two adhesive substances being preponderantly resinous and being a member of the group consisting of resins and fusions of resins with solid plasticizers, the individual particles of the adhesive substances being capable, when the coating is heated to the fusing temperature, of coalescing to form a blend which thereafter possesses a softening temperature lower than that of either of said two particulate components of the original coating.

2. Sheet material bearing on one side a hard, non-tacky, but heat-activatable coating which comprises a substantially uniform mixture of finely divided discrete particles of two different heat-activatable adhesive substances, one of said substances comprising the solidified fusion product of resinous material with a greater quantity of a solid plasticizer and the second of said two substances comprising the solidified fusion product of resinous material with a minor quantity

TABLE 6

| No. Example | High-Plasticizer Component | High-Resin Component | Delay Period |
|---|---|---|---|
| 19 | 95 parts of Example 9 | 5 parts of Example 16 | About 7 days. |
| 20 | 90 parts of Example 13 | 10 parts of Example 18 | About 2 weeks. |
| 21 | 90 parts of Example 8 | 10 parts of Example 16 | About 3 weeks. |
| 22 | 67 parts of Example 10 | 33 parts of Example 11 | About 4 weeks. |
| 23 | 62 parts of Example 8 | 20 parts of Indene resin of M. P. 150° C. and 18 parts of "Pentalyn G". | About 3 months. |
| 24 | 70 parts of Example 8 | 30 parts of Example 16 | About 6 months. |
| 25 | 62 parts of Example 8 | 38 parts of "Pentalyn G" | Over 6 months. |

All parts by weight.

of a solid plasticizer, and an initially water-dispersible binder in quantity sufficient to bind the said particles to the surface of the sheet material.

3. A heat-activatable adhesive composition which comprises a substantially uniform mixture of finely divided discrete particles of two different resinous heat-activatable adhesive substances, each discrete particle of one of said adhesive substances comprising the solidified fusion product of resinous material with a substantially greater quantity of a solid plasticizer and each discrete particle of the second of said two adhesive substances being resin, said mixture when heated to its fusing temperature being capable of coalescing to a blend which when cooled to hardness and subsequently reheated will thereafter exhibit a softening temperature substantially lower than that of the original mixture.

4. A paper sheet having on one side a heat-activatable adhesive coating which-comprises a substantially uniform mixture of finely divided discrete particles of two different resinous components of which one component is the solidified resinous product resulting from fusion of resin with as great an amount of solid plasticizer and the second component is a member of the group consisting of resins and fusions of resins with solid plasticizers, said fusions being of different composition from said one component, the said particles being bound to the sheet and to each other by a water dispersible binder which is a rubber.

5. The product of claim 4 in which the second resinous component consists of particles of resin containing substantially no plasticizer.

6. The product of claim 4 in which the second resinous component is the solidified resinous product resulting from fusion of resin with a smaller quantity of a solid plasticizer.

7. The product of claim 4 in which the second resinous component is the solidified resinous product resulting from the fusion of resin with a greater quantity of a solid plasticizer.

8. An adhesive composition which contains in intimate mixture finely powdered particles of two resinous components, one of said resinous components being the solidified fusion product of resin with a quantity of plasticizer in excess of that permanently compatible with the resin at room temperature, and the second of said resinous components containing a lower proportion of plasticizer to resin than said first resinous component contains.

9. An adhesive composition which contains in intimate mixture finely powdered particles of two resinous components, one of said resinous components being the solidified fusion product of resin with a quantity of plasticizer in excess of that permanently compatible with the resin at room temperature, and the second of said resinous components containing less plasticizer than is permanently compatible with the resin at room temperature.

10. An adhesive composition which contains in intimate mixture finely powdered particles of two resinous components, one component consisting predominatingly of resin and being a member of the group consisting of resins and fusions of resins with solid plasticizers and the second component being the solidified fusion product of resin with a quantity of plasticizer in excess of that permanently compatible with the resin at room temperature.

11. An aqueous coating composition containing dispersed therein two powdered fusion products of different composition, both of which contain a rosin derivative soluble in aqueous alkali and at least one of which contains a plasticizer, a dissolved reaction product of a rosin derivative with an alkali, and binding material comprising a rubbery emulsion-polymer of a composition containing an ethylenically unsaturated monomer.

12. An aqueous coating composition containing dispersed therein two powdered fusion products of different composition, both of which contain a rosin derivative soluble in aqueous alkali and at least one of which contains a plasticizer, a dissolved reaction product of a rosin derivative with a fixed alkali, and binding material comprising a rubbery emulsion-polymer of a composition containing an ethylenically unsaturated monomer.

13. A process which includes fusing together resin, a portion at least of which is a rosin derivative soluble in aqueous alkali, and plasticizer in quantity in excess of that permanently compatible with said resin at room temperature, solidifying the fusion product by cooling, powdering the solidified fusion product, and dispersing the powder in an aqueous medium in the presence of dissolved alkali.

14. A process which includes making two separate fusions, one fusion containing resin at least a portion of which is a rosin derivative soluble in aqueous alkali, and plasticizer in quantity in excess of that permanently compatible with said resin at room temperature; the other fusion also including a rosin derivative soluble in aqueous alkali and being preponderently resinous and being a member of the group consisting of resins and fusions of resins with solid plasticizers; cooling the two fusions and grinding them to powder; dispersing both powdered materials in an aqueous medium in the presence of dissolved alkali and dissolved resinate of an alkali; and coating sheet material with the resulting composition.

15. An aqueous coating composition containing dispersed therein a finely divided resinous component, a dispersing agent for said resinous component, and a binding agent; said resinous component comprising a mixture of two separate and different powdered resinous compositions, the first powdered composition amounting to from 55 to 99 percent of the total resinous component and comprising the fusion product of from 70 to 95 percent of crystalline plasticizer and from 30 to 5 percent of resin, and the second powdered composition amounting to from 45 to 1 percent of the total resinous component and comprising the fusion product of from 5 to 25 percent of crystalline plasticizer and from 95 to 75 percent of resin.

16. Sheet material having a heat-activatable coating comprising the dried residue of the coating composition of claim 15.

17. An alkaline aqueous coating composition containing dispersed therein a finely divided resinous component, a dispersing agent therefor, and a binding component; said resinous component comprising a mixture of two separate and different resinous compositions, the first of said resinous compositions being the powdered high-plasticizer fusion product of from 70 to 95 parts of crystalline plasticizer and from 30 to 5 parts of resin at least part of which is soluble in aqueous alkali, and the second of said resinous compositions being the powdered low-plasticizer fusion product of from 5 to 25 parts of crystalline plasticizer and from 75 to 95 parts of resin at least part of which is soluble in aqueous alkali, the relative amounts of the two fusion products being within the range of from 60 to 95 parts of high-plasticizer fusion product to 40 to 5 parts of low-plasticizer fusion product; said binding component comprising a rubbery emulsion polymer of a composition containing an ethylenically unsaturated monomer.

18. Paper coated with the composition of claim 17.

19. An alkaline aqueous coating composition containing dispersed therein a finely divided resinous component and a binding component, said resinous component comprising a mixture of from 70 to 95 parts of the powdered fusion product of 80 parts of diphenyl phthalate with about 20 parts of resin some of which is soluble in aqueous alkali and from 30 to 5 parts of the powdered fusion product of about 15 parts of diphenyl phthalate with 85 parts of resin some of which is soluble in aqueous alkali, and said binding component containing a rubbery emulsion polymer of a composition containing an ethylenically unsaturated monomer, said binding component being present in quantity amounting to not over 25 percent of the weight of resinous component present.

20. A paper sheet having on one side a heat-activatable coating comprising the dried residue of the coating composition of claim 19.

21. An alkaline aqueous coating composition containing dispersed therein a finely divided resinous component, a dispersing agent, and a binding agent; said resinous component comprising a mixture of two separate powdered resinous compositions, one of said resinous compositions being the fusion product of about 80 parts of diphenyl phthalate plasticizer, about 5 parts of indene resin, and about 15 parts of modified rosin compounds at least part of which is soluble in aqueous alkali, the second of said resinous compositions being the fusion product of about 15 parts of diphenyl phthalate plasticizer, about 79 parts of indene resin and about 6 parts of modified rosin ester, the two said resinous compositions being present in about the ratio of 95 parts by weight of the first to 5 parts by weight of the second; said dispersing agent comprising a soluble soap of a rosin derivative; and said binding agent containing emulsion polymerized styrene-butadiene copolymer.

22. Paper product comprising a paper sheet having on one side a heat-activatable coating containing the dried residue of the coating composition of claim 21.

23. A heat-activatable adhesive composition which comprises a substantially uniform mixture of finely divided discrete particles of two different resinous adhesive substances, each discrete particle of one of said adhesive substances being a solidified fusion product of resin and solid plasticizer, the greater part, but not over 95 percent, of which is plasticizer, and each discrete particle of a second of the said adhesive substances being proponderently resinous and being a member of the group consisting of resins and fusions of resins with solid plasticizers, said mixture when heated to its fusing temperature being capable of coalescing to a blend which when cooled to hardness and subsequently reheated will thereupon exhibit a softening temperature substantially lower than that of the original mixture.

24. A heat-activatable adhesive composition comprising a mixture of two different powdered resinous compositions, the first powdered resinous composition amounting to from 55 to 99 percent of the mixture and comprising the fusion products of from 70 to 95 percent of crystalline plasticizer and from 30 to 5 percent of resin, and the second powdered resinous composition amounting to from 45 to 1 percent of the mixture and comprising the fusion product of from 5 to 25 percent of crystalline plasticizer and from 95 to 75 percent of resin.

ROBERT L. SMITH.
CHARLES M. WISWELL.

REFERENCES CITED

The following references are of record in the file of this patent:

UNITED STATES PATENTS

| Number | Name | Date |
|---|---|---|
| 2,462,029 | Perry | Feb. 15, 1949 |